(12) United States Patent
Wittkopp et al.

(10) Patent No.: US 8,047,945 B2
(45) Date of Patent: *Nov. 1, 2011

(54) MULTI-SPEED TRANSMISSION WITH EXTERNAL DRIVE GEARSETS

(75) Inventors: Scott H. Wittkopp, Ypsilanti, MI (US); Andrew W. Phillips, Rochester, MI (US); Clinton E. Carey, Highland, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/010,268

(22) Filed: Jan. 20, 2011

(65) Prior Publication Data

US 2011/0111912 A1    May 12, 2011

Related U.S. Application Data

(63) Continuation of application No. 12/036,632, filed on Feb. 25, 2008, now Pat. No. 7,896,772.

(51) Int. Cl.
*F16H 3/62* (2006.01)
(52) U.S. Cl. .................................. 475/219; 477/277
(58) Field of Classification Search .................. 475/207, 475/219, 245–278, 284
See application file for complete search history.

(56) References Cited

U.S. PATENT DOCUMENTS

| | | | |
|---|---|---|---|
| 6,471,615 B1 * | 10/2002 | Naraki et al. | 475/262 |
| 6,984,187 B2 * | 1/2006 | Biermann | 475/275 |
| 7,717,819 B2 * | 5/2010 | Wittkopp et al. | 475/218 |
| 2009/0082163 A1 * | 3/2009 | Phillips et al. | 475/275 |
| 2009/0082167 A1 * | 3/2009 | Wittkopp et al. | 475/311 |

* cited by examiner

*Primary Examiner* — Ha D. Ho

(57) ABSTRACT

A transmission is provided having an input member, an output member, three planetary gear sets, four external gear sets, a plurality of coupling members and a plurality of torque transmitting devices. Each of the planetary gear sets includes first, second and third members. Each of the external gear sets includes first and second gears. The torque transmitting devices may include clutches and brakes.

20 Claims, 2 Drawing Sheets

| GEAR STATE | GEAR RATIO | RATIO STEP | TORQUE TRANSMITTING MECHANISMS ||||| 
|---|---|---|---|---|---|---|---|
| | | | 48 | 44 | 40 | 42 | 46 |
| REV | -5.321 | | X | X | | | X |
| N | | -1.16 | | | | | |
| 1st | 4.594 | | X | X | X | | |
| 2nd | 3.010 | 1.53 | X | X | | X | |
| 3rd | 2.088 | 1.44 | | X | X | X | |
| 4th | 1.695 | 1.23 | | X | | X | X |
| 5th | 1.247 | 1.36 | | X | X | | X |
| 6th | 1.019 | 1.22 | | | X | X | X |
| 7th | 0.887 | 1.15 | X | | X | | X |
| 8th | 0.667 | 1.33 | X | | | X | X |

X = ON, CARRYING TORQUE
O = ON, NOT CARRYING TORQUE

MULTI-SPEED TRANSMISSION WITH EXTERNAL DRIVE GEARSETS

CROSS-REFERENCE TO RELATED APPLICATIONS

This application is a continuation of U.S. application Ser. No. 12/036,632, filed on Feb. 25, 2008 which claims the benefit of U.S. Provisional Application No. 60/974,656, filed on Sep. 24, 2007. The disclosure of the above application is incorporated herein by reference.

FIELD

The invention relates generally to a multiple speed transmission having a plurality of gear sets and a plurality of torque transmitting devices, and more particularly to a transmission having eight or more speeds produced by a combination of planetary gear sets, external gear sets and torque transmitting devices.

BACKGROUND

The statements in this section merely provide background information related to the present disclosure and may or may not constitute prior art.

A typical multiple speed transmission uses a combination of friction clutches or brakes, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, three planetary gear sets, four external gear sets, a plurality of coupling members and a plurality of torque transmitting devices. Each of the planetary gear sets includes first, second and third members. Each of the external gear sets include first and second gear members. The torque transmitting devices are for example clutches and brakes.

An embodiment of the transmission includes an input member, an output member, a first, second, and third planetary gear set each having a first, second, and third member, a first, second, third, and fourth gear set each having a first gear intermeshed with a second gear, a first interconnecting member continuously interconnecting the second gear of the first gear set with the first member of the first planetary gear set, a second interconnecting member continuously interconnecting the third member of the first planetary gear set with the first gear of the second gear set, a third interconnecting member continuously interconnecting the first gear of the third gear set with the third member of the second planetary gear set and the first member of the third planetary gear set, a fourth interconnecting member continuously interconnecting the first member of the second planetary gear set with the second gear of the second gear set, and a fifth interconnecting member continuously interconnecting the second member of the third planetary gear set with the first gear of the fourth gear set. Five torque transmitting mechanisms are selectively engageable to interconnect one of the first members, second members, third members, first gears, and second gears with at least one of the first members, second members, third members, first gears, second gears, and a stationary element. The torque transmitting mechanisms are selectively engageable in combinations of at least three to establish at least eight forward speed ratios and at least one reverse speed ratio between the input member and the output member.

In one aspect of the present invention, a first of the five torque transmitting mechanisms is selectively engageable to interconnect the second gear of the third gear set with at least one of the second member of the first planetary gear set and the input member.

In another aspect of the present invention, a second of the five torque transmitting mechanisms is selectively engageable to interconnect at least one of the third member of the first planetary gear set and the first gear of the second gear set with the second gear of the third gear set.

In yet another aspect of the present invention, a third of the five torque transmitting mechanisms is selectively engageable to interconnect the first gear of the first gear set with the third member of the third planetary gear set.

In yet another aspect of the present invention, a fourth of the five torque transmitting mechanisms is selectively engageable to interconnect the third member of the third planetary gear set with the second member of the second planetary gear set.

In yet another aspect of the present invention, a fifth of the five torque transmitting mechanisms is selectively engageable to interconnect at least one of the second gear of the first gear set and the first member of the first planetary gear set with the stationary element.

In yet another aspect of the present invention, the first and second torque transmitting mechanisms are connected to the second gear of the third co-planar gear set by a first sleeve shaft, the fifth torque transmitting mechanism is connected to the second gear of the first co-planar gear set and the first member of the first planetary gear set by a second sleeve shaft, and the first and second sleeve shafts are concentric with the input member.

In yet another aspect of the present invention, the fourth torque transmitting mechanism is connected to the second member of the second planetary gear set by a third sleeve shaft that is concentric with the third and fourth interconnecting members.

In yet another aspect of the present invention, the input member is continuously interconnected with the second member of the first planetary gear set and the output member is continuously interconnected with the second gear of the fourth gear set.

In yet another aspect of the present invention, the first members are sun gears, the second members are carrier members, and the third members are ring gears.

In yet another aspect of the present invention, the first gears and the second gears within each of the first, second, third, and fourth gear sets are co-planar.

In yet another aspect of the present invention, the input member, the first and second interconnecting members, and the first planetary gear set are co-axial and wherein the third, fourth, and fifth interconnecting members, the second planetary gear set, and the third planetary gear set are co-axial.

In yet another aspect of the present invention, the output member is offset from the first, second, third, fourth, and fifth interconnecting members and the input member.

In yet another aspect of the present invention, the stationary element is a transmission housing.

Another embodiment of the transmission of the present invention includes an input member, an output member, a first, second, and third planetary gear set each having a first, second, and third member, wherein the input member is continuously interconnected with the second member of the first planetary gear set, a first, second, third, and fourth gear set each having a first gear intermeshed with a second gear, wherein the output member is continuously interconnected with the second gear of the fourth gear set, a first interconnecting member continuously interconnecting the second gear of the first gear set with the first member of the first planetary gear set, a second interconnecting member continuously interconnecting the third member of the first planetary gear set with the first gear of the second gear set, a third interconnecting member continuously interconnecting the first gear of the third gear set with the third member of the second planetary gear set and the first member of the third planetary gear set, a fourth interconnecting member continuously interconnecting the first member of the second planetary gear set with the second gear of the second gear set, and a fifth interconnecting member continuously interconnecting the second member of the third planetary gear set with the first gear of the fourth gear set. A first torque transmitting mechanism is selectively engageable to interconnect the second gear of the third gear set with at least one of the second member of the first planetary gear set and the input member, a second torque transmitting mechanism is selectively engageable to interconnect at least one of the third member of the first planetary gear set and the first gear of the second gear set with the second gear of the third gear set, a third torque transmitting mechanism is selectively engageable to interconnect the first gear of the first gear set with the third member of the third planetary gear set, a fourth torque transmitting mechanism is selectively engageable to interconnect the third member of the third planetary gear set with the second member of the second planetary gear set, and a fifth torque transmitting mechanism is selectively engageable to interconnect at least one of the second gear of the first gear set and the first member of the first planetary gear set with a stationary element. The torque transmitting mechanisms are selectively engageable in combinations of at least three to establish at least eight forward speed ratios and at least one reverse speed ratio between the input member and the output member.

In one aspect of the present invention, the first members are sun gears, the second members are carrier members, and the third members are ring gears.

In another aspect of the present invention, the first gears and the second gears within each of the first, second, third, and fourth gear sets are co-planar.

In yet another aspect of the present invention, the input member, the first and second interconnecting members, and the first planetary gear set are co-axial and wherein the third, fourth, and fifth interconnecting members, the second planetary gear set, and the third planetary gear set are co-axial.

In yet another aspect of the present invention, the output member is offset from the first, second, third, fourth, and fifth interconnecting members and the input member.

In yet another aspect of the present invention, the stationary element is a transmission housing.

Still another embodiment of the transmission of the present invention includes an input member, an output member, a first, second, and third planetary gear set each having a sun gear, a carrier member, and a ring gear, wherein the input member is continuously interconnected with the carrier member of the first planetary gear set, a first, second, third, and fourth gear set each having a first gear intermeshed with a second gear, wherein the output member is continuously interconnected with the second gear of the fourth gear set, a first interconnecting member continuously interconnecting the second gear of the first gear set with the sun gear of the first planetary gear set, a second interconnecting member continuously interconnecting the ring gear of the first planetary gear set with the first gear of the second gear set, a third interconnecting member continuously interconnecting the first gear of the third gear set with the ring gear of the second planetary gear set and the sun gear of the third planetary gear set, a fourth interconnecting member continuously interconnecting the sun gear of the second planetary gear set with the second gear of the second gear set, and a fifth interconnecting member continuously interconnecting the carrier member of the third planetary gear set with the first gear of the fourth gear set. A first torque transmitting mechanism is selectively engageable to interconnect the second gear of the third gear set with at least one of the carrier member of the first planetary gear set and the input member, a second torque transmitting mechanism is selectively engageable to interconnect at least one of the ring gear of the first planetary gear set and the first gear of the second gear set with the second gear of the third gear set, a third torque transmitting mechanism is selectively engageable to interconnect the first gear of the first gear set with the ring gear of the third planetary gear set, a fourth torque transmitting mechanism is selectively engageable to interconnect the ring gear of the third planetary gear set with the carrier member of the second planetary gear set, and a fifth torque transmitting mechanism is selectively engageable to interconnect at least one of the second gear of the first gear set and the sun gear of the first planetary gear set with a stationary element. The torque transmitting mechanisms are selectively engageable in combinations of at least three to establish at least eight forward speed ratios and at least one reverse speed ratio between the input member and the output member.

In one aspect of the present invention, the first gears and the second gears within each of the first, second, third, and fourth gear sets are co-planar.

In another aspect of the present invention, the input member, the first and second interconnecting members, and the first planetary gear set are co-axial and wherein the third, fourth, and fifth interconnecting members, the second planetary gear set, and the third planetary gear set are co-axial.

In yet another aspect of the present invention, the output member is offset from the first, second, third, fourth, and fifth interconnecting members and the input member.

In yet another aspect of the present invention, the stationary element is a transmission housing.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figures 1, 3:
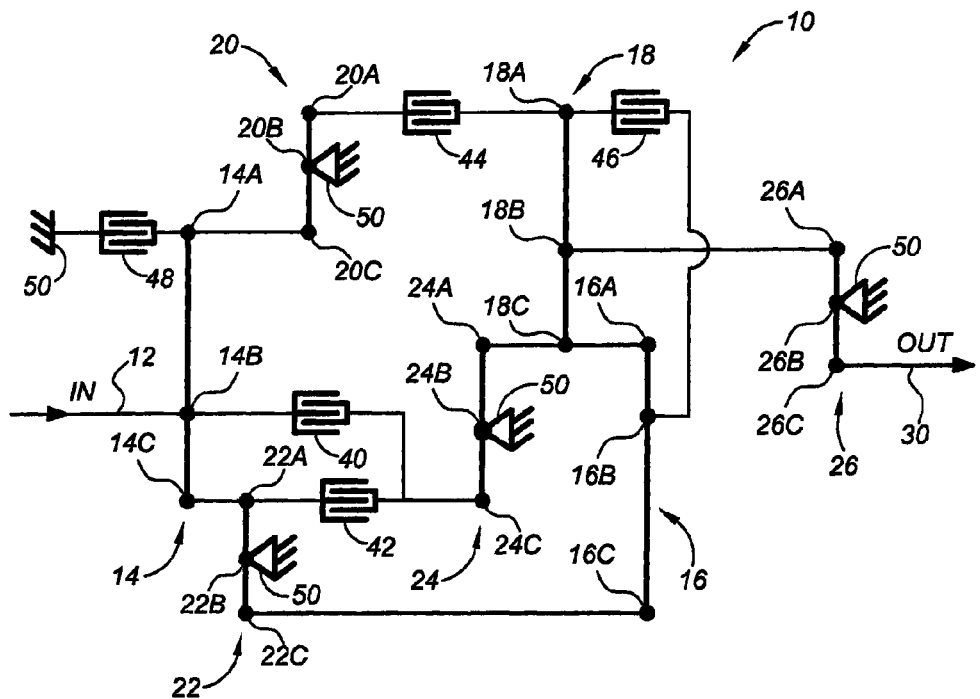
FIG. 1 is a lever diagram of an embodiment of an eight speed transmission according to the present invention.
FIG. 3 is a truth table presenting the state of engagement of the various torque transmitting elements in each of the available forward and reverse speeds or gear ratios of the transmission illustrated in FIGS. 1 and 2.

Referring now to FIG. 1, an embodiment of an eight speed transmission 10 is illustrated in a lever diagram format. A lever diagram is a schematic representation of the components of a mechanical device such as an automatic transmission. Each individual lever represents a gear set. Solid line levers represent a planetary gear set wherein the three basic mechanical components of the planetary gear set are each represented by a node. Therefore, a single planetary gear set lever contains three nodes: one for the sun gear, one for the planet gear carrier, and one for the ring gear. Dashed line levers are spur or external drive gear sets which may be represented in the lever diagram as planetary gear sets having grounded planet carrier members. Accordingly, the outer nodes represent the first and second drive gears and the inner node represents the imaginary grounded planet carrier member. The relative length between the nodes of each lever can be used to represent the ring-to-sun ratio and first drive gear to second drive gear ratio of each respective gear set. These lever ratios, in turn, are used to vary the gear ratios of the transmission in order to achieve appropriate ratios and ratio progression. Mechanical couplings or interconnections between the nodes of the various planetary gear sets are illustrated by thin, horizontal lines and torque transmitting devices such as clutches and brakes are presented as interleaved fingers. Where the torque transmitting device is a brake, one set of interleaved fingers is coupled to a ground. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a first external gear set 20 having three nodes: a first node 20A, a second node 20B and a third node 20C, a second external gear set 22 having three nodes: a first node 22A, a second node 22B and a third node 22C, a second external gear set 24 having three nodes: a first node 24A, a second node 24B and a third node 24C, a fourth external gear set 26 having three nodes: a first node 26A, a second node 26B and a third node 26C, and an output shaft or member 30.

The input member 12 is coupled to the second node 14B of the first planetary gear set 14. The output member 30 is coupled to the third node 26C of the fourth external gear set 26. The first node 14A of the first planetary gear set 14 is coupled to the third node 20C of the first external gear set 20. The third node 14C of the first planetary gear set 14 is coupled to the first node 22A of the second external gear set 22. The first node 16A of the second planetary gear set 16 is coupled to the third node 18C of the third planetary gear set 18 and to the first node 24A of the third external gear set 24. The third node 16C of the second planetary gear set 16 is coupled to the third node 22C of the second external gear set 22. The second node 18B of the third planetary gear set 18 is coupled to the first node 26A of the fourth external gear set 26.

A first clutch 40 selectively connects the second node 14B of the first planetary gear set 14 to the third node 24C of the third external gear set 24. A second clutch 42 selectively connects third node 14C of the first planetary gear set 14 and the first node 22A of the second external gear set 22 to the third node 24C of the third external gear set 24. A third clutch 44 selectively connects the first node 20A of the first external gear set 20 to the first node 18A of the third planetary gear set 18. A fourth clutch 46 selectively connects the second node 16B of the second planetary gear set 16 to the first node 18A of the third planetary gear set 18. A first brake 48 selectively connects the first node 14A of the first planetary gear set 14 to a stationary element or transmission housing 50.

Figure 2:
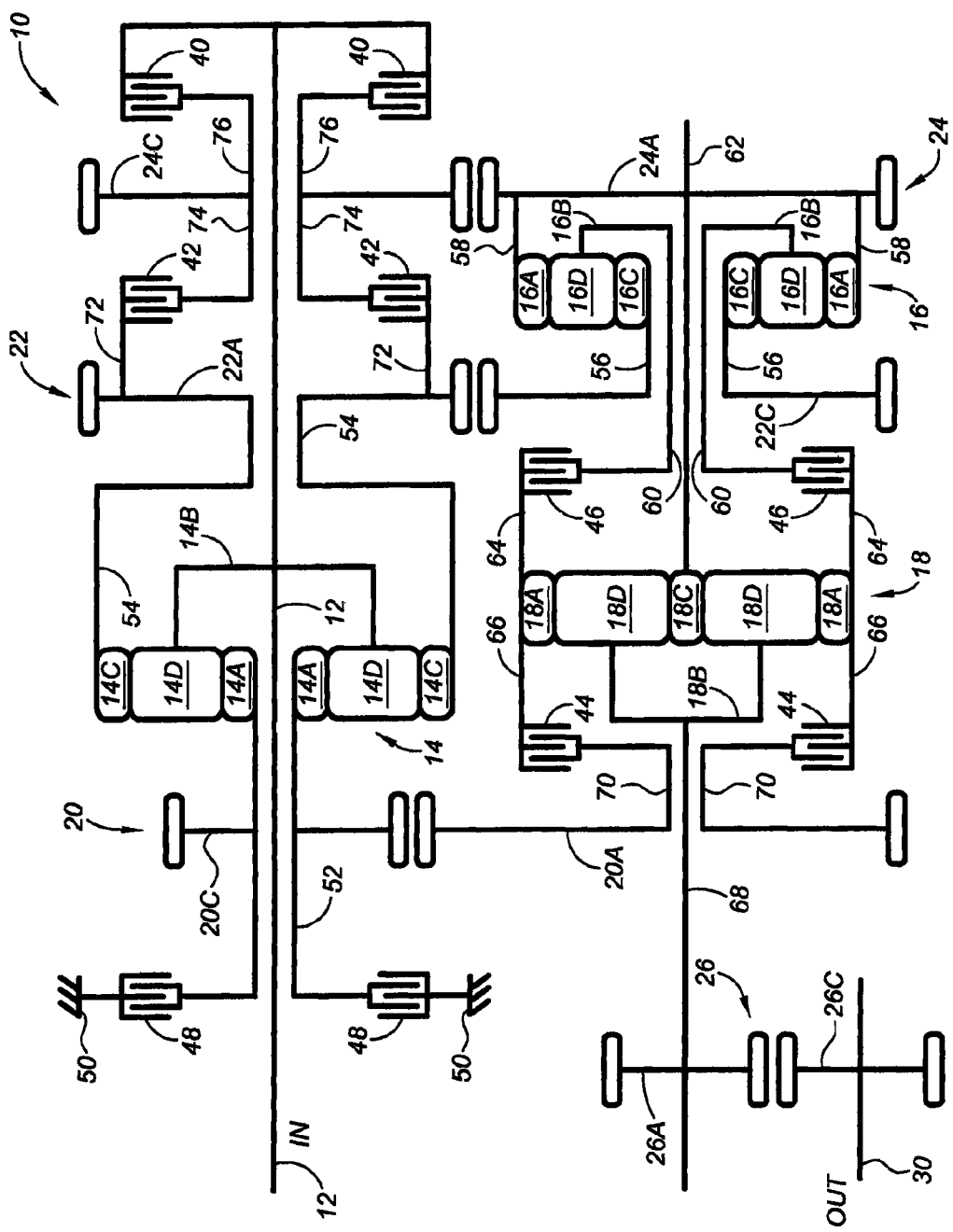
FIG. 2 is a diagrammatic view of an embodiment of an eight speed transmission according to the present invention.

Referring now to FIG. 2, a schematic diagram illustrates an embodiment of the eight speed transmission 10 according to the present invention. In FIG. 2, the numbering from the lever diagram of FIG. 1 is carried over. The clutches, brakes, and couplings or interconnections are correspondingly presented whereas the nodes of the planetary gear sets now appear as components of planetary gear sets such as sun gears, ring gears, planet gears and planet gear carriers and the nodes of the external drive gear sets now appear as components of the external drive gear sets such as first and second drive gears.

For example, planetary gear set 14 includes a sun gear member 14A, a planet gear carrier member 14B and a ring gear member 14C. The planet gear carrier member 14B rotatably supports a set of planet gears 14D configured to intermesh with both the sun gear member 14A and the ring gear member 14C. The sun gear member 14A is connected for common rotation with a first shaft or interconnecting member 52. The planet carrier member 14B is connected for common rotation with the input shaft or member 12. The ring gear member 14C is connected for common rotation with a second shaft or interconnecting member 54.

The planetary gear set 16 includes a sun gear member 16C, a planet gear carrier member 16B and a ring gear member 16A. The planet gear carrier member 16B rotatably supports a set of planet gears 16D configured to intermesh with both the sun gear member 16C and the ring gear member 16A. The sun gear member 16C is connected for common rotation with a third shaft or interconnecting member 56. The ring gear member 16A is connected for common rotation with a fourth shaft or interconnecting member 58. The planet carrier member 16B is connected for common rotation with fifth shaft or interconnecting member 60.

The planetary gear set 18 includes a sun gear member 18C, a planet gear carrier member 18B and a ring gear member 18A. The planet gear carrier member 18B rotatably supports a set of planet gears 18D configured to intermesh with both the sun gear member 18C and the ring gear member 18A. The sun gear member 18C is connected for common rotation with a sixth shaft or interconnecting member 62. The ring gear member 18A is connected for common rotation with a seventh shaft or interconnecting member 64 and an eighth shaft or interconnecting member 66. The planet carrier member 18B is connected for common rotation with a ninth shaft or interconnecting member 68.

The external gear set 20 includes a first gear member 20A intermeshed with a second gear member 20C. The first gear member 20A is connected for common rotation with a tenth interconnecting member 70. The second gear member 20C is connected for common rotation with the first shaft or interconnecting member 52.

The external gear set 22 includes a first gear member 22A intermeshed with a second gear member 22C. The first gear member 22A is connected for common rotation with the second interconnecting member 54 and the eleventh interconnecting member 72. The second gear member 22C is connected for common rotation with an third interconnecting member 56.

The external gear set 24 includes a first gear member 24A intermeshed with a second gear member 24C. The first gear member 24A is connected for common rotation with the fourth interconnecting member 58 and the sixth interconnecting member 62. The second gear member 24C is connected for common rotation with the twelfth shaft or interconnecting member 74 and the thirteenth shaft or interconnecting member 76.

The external gear set 26 includes a first gear member 26A intermeshed with a second gear member 26C. The first gear member 26A is connected for common rotation with ninth shaft or interconnecting member 68. The second gear member 26C is connected for common rotation with the output member 30.

The input shaft or member 12 is continuously connected to an engine (not shown) or to a turbine of a torque converter (not shown). The output shaft or member 30 is continuously connected with the final drive unit or transfer case (not shown).

The torque-transmitting elements or the clutches 40, 42, 44, 46 and brake 48 allow for selective interconnection of the shafts or interconnecting members, members of the planetary gear sets and external gear sets, and the transmission housing. For example, the first clutch 40 is selectively engageable to connect the input member 12 with the thirteenth interconnecting member 76. The second clutch 42 is selectively engageable to connect the eleventh interconnecting member 72 with the twelfth interconnecting member 74. The third clutch 44 is selectively engageable to connect the eighth interconnecting member 66 with the tenth interconnecting member 70. The fourth clutch 46 is selectively engageable to connect the fifth interconnecting member 60 with the seventh interconnecting member 64. The first brake 48 is selectively engageable to connect the first interconnecting member 52 to a stationary element or the transmission housing 50 in order to restrict the first interconnecting member 52 and therefore the second gear member 20C and the sun gear member 14A from rotating relative to the transmission housing 50.

In the particular example provided, the transmission 10 is arranged along three parallel and spaced apart axes including a first axis defined by the input member 12, a second axis defined by the sixth interconnecting member 62 and the ninth interconnecting member 68 and a third axis defined by the output member 30. Accordingly, in the example provided, the interconnecting members 52, 54, 74, 76, the planetary gear set 14, the second gear member 20C, the first gear member 22A, the second gear member 24C, the first brake 48 and the clutches 40, 42 are all coaxial with the first axis. The interconnecting members 56, 58, 60, 64, 66, 70, the planetary gear sets 16 and 18, the first gear member 20A, the second gear member 22C, the first gear member 24A, the first gear member 26A, the third clutch 44, the fourth clutch 46 and are all coaxial with the second axis. Finally, the second gear member 26C is coaxial with the third axis. Additionally, the transmission 10 is preferably configured for a front wheel drive vehicle.

Referring now to FIG. 3, the operation of the embodiments of the eight speed transmission 10 will be described. It will be appreciated that the transmission 10 is capable of transmitting torque from the input shaft or member 12 to the output shaft or member 30 in at least eight forward speed or torque ratios and at least one reverse speed or torque ratio. Each forward and reverse speed or torque ratio is attained by engagement of one or more of the torque-transmitting mechanisms (i.e. first clutch 40, second clutch 42, third clutch 44, fourth clutch 46, and first brake 48), as will be explained below. FIG. 3 is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

To establish reverse gear, the third clutch 44, the fourth clutch 46, and the first brake 48 are engaged or activated. The third clutch 44 connects the eighth interconnecting member 66 with the tenth interconnecting member 70. The fourth clutch 46 connects the fifth interconnecting member 60 with the seventh interconnecting member 64. The first brake 48 connects the first interconnecting member 52 to a stationary element or the transmission housing 50 in order to restrict the first interconnecting member 52 and therefore the second gear member 20C and the sun gear member 14A from rotating relative to the transmission housing 50. Likewise, the eight forward ratios are achieved through different combinations of clutch and brake engagement, as shown in FIG. 3.

It will be appreciated that the foregoing explanation of operation and gear states of the eight speed transmission 10 assumes, first of all, that all the clutches and brakes not specifically referenced in a given gear state are inactive or disengaged and, second of all, that during gear shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim the following:
1. A transmission comprising:
an input member;
an output member;
a first, second, and third planetary gear set each having a first, second, and third member;
a first, second, third, and fourth co-planar gear set each having a first gear intermeshed with a second gear;
a first torque transmitting mechanism selectively engageable to interconnect the second gear of the third co-planar gear set with at least one of the second member of the first planetary gear set and the input member;
a second torque transmitting mechanism selectively engageable to interconnect at least one of the third member of the first planetary gear set and the first gear of the second co-planar gear set with the second gear of the third co-planar gear set;
a third torque transmitting mechanism selectively engageable to interconnect the first gear of the first co-planar gear set with the third member of the third planetary gear set;
a fourth torque transmitting mechanism selectively engageable to interconnect the third member of the third planetary gear set with the second member of the second planetary gear set; and
a fifth torque transmitting mechanism selectively engageable to interconnect at least one of the second gear of the first co-planar gear set and the first member of the first planetary gear set with a stationary element, wherein the torque transmitting mechanisms are selectively engageable in combinations of at least three to establish at least eight forward speed ratios and at least one reverse speed ratio between the input member and the output member.

2. The transmission of claim 1 further comprising a first interconnecting member continuously interconnecting the second gear of the first co-planar gear set with the first member of the first planetary gear set.

3. The transmission of claim 2 further comprising a second interconnecting member continuously interconnecting the third member of the first planetary gear set with the first gear of the second co-planar gear set.

4. The transmission of claim 3 further comprising a third interconnecting member continuously interconnecting the first gear of the third co-planar gear set with the third member of the second planetary gear set and the first member of the third planetary gear set.

5. The transmission of claim 4 further comprising a fourth interconnecting member continuously interconnecting the first member of the second planetary gear set with the second gear of the second co-planar gear set.

6. The transmission of claim 5 further comprising a fifth interconnecting member continuously interconnecting the second member of the third planetary gear set with the first gear of the fourth co-planar gear set.

7. The transmission of claim 1 wherein the input member is continuously interconnected with the second member of the first planetary gear set and wherein the output member is continuously interconnected with the second gear of the fourth co-planar gear set.

8. The transmission of claim 1 wherein the first members are sun gears, the second members are carrier members, and the third members are ring gears.

9. The transmission of claim 1 wherein the first and second torque transmitting mechanisms are connected to the second gear of the third co-planar gear set by a first sleeve shaft, wherein the fifth torque transmitting mechanism is connected to the second gear of the first co-planar gear set and the first member of the first planetary gear set by a second sleeve shaft, and wherein the first and second sleeve shafts are concentric with the input member.

10. The transmission of claim 1 wherein the input member, a first interconnecting member, a second interconnecting member, and the first planetary gear set are co-axial and wherein a third interconnecting member, a fourth interconnecting member, a fifth interconnecting member, the second planetary gear set, and the third planetary gear set are co-axial, and wherein the output member is offset from the first, second, third, fourth, and fifth interconnecting members and the input member.

11. The transmission of claim 1 wherein the fourth torque transmitting mechanism is connected to the second member of the second planetary gear set by a third sleeve shaft that is concentric with a third interconnecting member and a fourth interconnecting member.

12. The transmission of claim 1 wherein the stationary element is a transmission housing.

13. An apparatus comprising:
an input member;
an output member;
a first, second, and third planetary gear set each having a first, second, and third member, wherein the input member is continuously interconnected with the second member of the first planetary gear set;
a first, second, third, and fourth gear set each having a first gear intermeshed with a second gear, wherein the output member is continuously interconnected with the second gear of the fourth gear set;
a first torque transmitting mechanism selectively engageable to interconnect the second gear of the third gear set with at least one of the second member of the first planetary gear set and the input member;
a second torque transmitting mechanism selectively engageable to interconnect at least one of the third member of the first planetary gear set and the first gear of the second gear set with the second gear of the third gear set;
a third torque transmitting mechanism selectively engageable to interconnect the first gear of the first gear set with the third member of the third planetary gear set;
a fourth torque transmitting mechanism selectively engageable to interconnect the third member of the third planetary gear set with the second member of the second planetary gear set; and
a fifth torque transmitting mechanism selectively engageable to interconnect at least one of the second gear of the first gear set and the first member of the first planetary gear set with a stationary element,
wherein the torque transmitting mechanisms are selectively engageable in combinations of at least three to establish at least eight forward speed ratios and at least one reverse speed ratio between the input member and the output member.

14. The transmission of claim 13 further comprising a first interconnecting member continuously interconnecting the second gear of the first gear set with the first member of the first planetary gear set.

15. The transmission of claim 14 further comprising a second interconnecting member continuously interconnecting the third member of the first planetary gear set with the first gear of the second gear set.

16. The transmission of claim 15 further comprising a third interconnecting member continuously interconnecting the first gear of the third gear set with the third member of the second planetary gear set and the first member of the third planetary gear set.

17. The transmission of claim 16 further comprising a fourth interconnecting member continuously interconnecting the first member of the second planetary gear set with the second gear of the second gear set.

18. The transmission of claim 17 further comprising a fifth interconnecting member continuously interconnecting the second member of the third planetary gear set with the first gear of the fourth gear set.

19. The transmission of claim 13 wherein the first members are sun gears, the second members are carrier members, and the third members are ring gears.

20. The transmission of claim 13 wherein the first gears and the second gears within each of the first, second, third, and fourth gear sets are co-planar.

* * * * *